United States Patent
Fishman et al.

(10) Patent No.: US 6,507,818 B1
(45) Date of Patent: Jan. 14, 2003

(54) DYNAMIC PRIORITIZATION OF FINANCIAL DATA BY PREDETERMINED RULES WITH AUDIO OUTPUT DELIVERED ACCORDING TO PRIORITY VALUE

(75) Inventors: Bradley S. Fishman, Charlevoix, MI (US); Wade J. Vagle, Woodbury, MN (US)

(73) Assignee: MarketSound LLC, Chicago, IL (US)

(*) Notice: Subject to any disclaimer, the term of this patent is extended or adjusted under 35 U.S.C. 154(b) by 0 days.

(21) Appl. No.: 09/363,125

(22) Filed: Jul. 28, 1999

(51) Int. Cl.[7] .............................................. G10L 13/04
(52) U.S. Cl. ..................... 704/270; 704/272; 704/274
(58) Field of Search ................................ 704/260, 258, 704/270, 272, 274; 705/35, 36

(56) References Cited

U.S. PATENT DOCUMENTS

| | | | |
|---|---|---|---|
| 4,554,418 A | 11/1985 | Toy | |
| 4,903,201 A | 2/1990 | Wagner | |
| 4,942,616 A | 7/1990 | Linstroth et al. | |
| 5,121,430 A | 6/1992 | Ganzer et al. | |
| 5,170,490 A | * 12/1992 | Cannon et al. | ............. 370/280 |
| 5,675,746 A | 10/1997 | Marshall | |
| 5,708,422 A | 1/1998 | Blonder et al. | |
| 5,774,878 A | 6/1998 | Marshall | |
| 5,806,050 A | 9/1998 | Shinn et al. | |
| 6,178,438 B1 | * 1/2001 | Tschirhart et al. | ..... 379/221.08 |
| 6,182,040 B1 | * 1/2001 | Monaco | ..................... 704/260 |

FOREIGN PATENT DOCUMENTS

WO     WO99/01983     1/1999

\* cited by examiner

Primary Examiner—Marsha D. Banks-Harold
Assistant Examiner—Abul K. Azad
(74) Attorney, Agent, or Firm—Rader, Fishman & Grauer PLLC

(57) ABSTRACT

A financial data system is disclosed that receives real-time data, uses a set of pre-determined rules to prioritize the data and provide a priority value, and then delivers the highest priority data by way of multiple audio channels. A key aspect of the invention is the use of data manipulation according to the priority value to adjust delivery volume, provide selective vocalization compression, add additional audio channels, or to override an existing comment when required. As a result of the invention, a significant amount of information may be aurally delivered to a user including properties of events as they change in response to changing financial conditions.

30 Claims, 10 Drawing Sheets

| Bid Family | |
|---|---|
| Simple Bid | |
| 1 | "B" Bid |
| 2 | "B" Bid (with BidHandle) |
| Bid with Size | |
| 3 | "B" Bid for "BS" |
| 4 | "B" Bid for "BS" (with BidHandle) |
| Qualitative BidSize | |
| 5 | "B" Bid for Size |
| 6 | "B" Bid for Size (with BidHandle) |
| 7 | Large Buyer |
| 8 | "B" Bid Small |
| 9 | "B" Bid Small (with BidHandle) |
| 10 | Few Buyers |
| 11 | No Buyers |
| Dynamic BidSizeUp | |
| 12 | Better Bids |
| 13 | Size on Bid Grows to "BS" |
| 14 | "B" Bid Growing |
| 15 | "B" Bid Growing (with BidHandle) |
| Dynamic BidSizeDown | |
| 16 | Small Sellers hitting bid |
| 17 | "B" Bid Getting Hit |
| 18 | "B" Bid Getting Hit (with BidHandle) |
| 19 | "B" Bids Cancelling |
| 20 | "B" Bids Cancelling (with BidHandle) |
| DeltaBid Price Up | |
| 21 | "B" Bid Back |
| 22 | "B" Bid Back (with BidHandle) |
| 23 | Bids Filling In |
| 24 | Bid Dimed for 'BS' |
| 25 | Best Bid Topped for 'BS' |
| 26 | New High Bid for 'BS' |
| DeltaBid Price Down | |
| 27 | Bid Drops to "B" |
| 28 | Bid Drops to "B" (with BidHandle) |
| 29 | "B" Bid Pulled |
| 30 | "B" Bid Pulled (with BidHandle) |
| 31 | "B" Bid Gone |
| 32 | "B" Bid Gone (with BidHandle) |
| 33 | Bids Cancelling; Best Bid Is "B" |
| 34 | Bids Cancelling; Best Bid Is "B" (with BidHandle) |
| Bid-Offer Combo Quote | |
| 35 | "B" Bid at "O" |
| 36 | "B" Bid at "O" (with BidHandle) |
| 37 | "B" Bid at "O" (with OfferHandle) |
| 38 | "B" Bid at "O"; "BS" by "OS" |
| 39 | "B" Bid at "O"; "BS" by "OS" (with BidHandle) |
| 40 | "B" Bid at "O"; "BS" by "OS" (with OfferHandle) |

FIG. 3A

| Offer Family | |
|---|---|
| Simple Offer | |
| 41 | At "O" |
| 42 | At "O" (with OfferHandle) |
| 43 | Offered at "O" |
| 44 | Offered at "O" (with OfferHandle) |
| Offer with Size | |
| 45 | "OS" Offered at "O" |
| 46 | "OS" Offered at "O" (with OfferHandle) |
| Qualitative OfferSize | |
| 47 | Size at "O" |
| 48 | Size at "O" (with OfferHandle) |
| 49 | Large Seller |
| 50 | Small Size at "O" |
| 51 | Small Size at "O" (with OfferHandle) |
| 52 | Few Sellers |
| 53 | No Sellers |
| Dynamic OfferSizeUp | |
| 54 | Better Offers |
| 55 | Size on Offer Grows to "OS" |
| 56 | "O" Offer Growing |
| 57 | "O" Offer Growing (with OfferHandle) |
| Dynamic OfferSizeDown | |
| 58 | Small buyers lifting offer |
| 59 | "O" Offers Taken |
| 60 | "O" Offers Taken (with OfferHandle) |
| 61 | "O" Offer Shrinking |
| 62 | "O" Offer Shrinking (with OfferHandle) |
| 63 | "O" Offer Canceling |
| 64 | "O" Offer Canceling (with OfferHandle) |
| DeltaOffer Price Down | |
| 65 | Offer Back at "O" |
| 66 | Offer Back at "O" (with OfferHandle) |
| 67 | Offers Filling In |
| 68 | Offer Dimed for 'OS' |
| 69 | Best Offer Bettered for 'OS' |
| 70 | New Low Offer for 'OS' |
| DeltaOffer Price Up | |
| 71 | Offer Lifts to "O" |
| 72 | Offer Lifts to "O" (with OfferHandle) |
| 73 | "O" Offer Pulled |
| 74 | "O" Offer Pulled (with OfferHandle) |
| 75 | "O" Offer Gone |
| 76 | "O" Offer Gone (with OfferHandle) |
| 77 | Offers Cancelling: best offer at "O" |
| 78 | Offers Cancelling: best offer at "O" (with OfferHandle) |

FIG. 3B

| Trade Family | |
|---|---|
| Simple Trade | |
| 79 | "P" Trades |
| 80 | "P" Trades (with Handle) |
| 81 | "P" Trading |
| 82 | "P" Trading (with Handle) |
| Simple Trade with Size | |
| 83 | "LQ" Lots Trades At "P" |
| 84 | "LQ" Lots Trades At "P" (with Handle) |
| Qualitative Trade Conditions | |
| 85 | Choppy Trading |
| 86 | Thin Trading |
| 87 | Nothing Trading |
| 88 | Quiet Market |
| 89 | Wide Market |
| 90 | Market Tightening Up |
| 91 | Fast Market Conditions |
| 92 | Whippy Market |
| 93 | Active Trade Conditions |
| 94 | Good Liquidity |
| Up Direction Trade | |
| 95 | Size Trades Up To "RangeHi" |
| 96 | Size Trades Up To "RangeHi" (with Handle) |
| 97 | Upside Move To "RangeHi" |
| 98 | Upside Move To "RangeHi" (with Handle) |
| 99 | Reval Up To "RangeHi" |
| 100 | Reval Up To "RangeHi" (with Handle) |
| 101 | "DeltaTTQ" market or stop orders Up To "RangeHi" (with Handle) |
| Down Direction Trade | |
| 102 | Size Trades Down To "RangeLo" |
| 103 | Size Trades Down To "RangeLo" (with Handle) |
| 104 | Downside Move To "RangeLo" |
| 105 | Downside Move To "RangeLo" (with Handle) |
| 106 | Reval Down To "RangeLo" |
| 107 | Reval Down To "RangeLo" (with Handle) |
| 108 | "DeltaTTQ" market or stop orders Down To "RangeLo" (with Handle) |

FIG. 3C

| Basis Family | |
|---|---|
| 109 | Futures Over Valued to Cash |
| 110 | Futures Under Valued to Cash |
| 111 | Futures Trading Around Fair Value to Cash |
| 112 | Basis Back to Fair Value |
| 113 | Basis Trading Around Fair Value |
| 114 | Current Basis Is "Basis" |
| Time Family | |
| 115 | Market Opens in 30 Seconds |
| 116 | Market Opens "ding ding" |
| 117 | Market Closes in 5 Minutes |
| 118 | Market Closes in 1 Minute |
| 119 | "Time" Graph check Reminder |
| Summary Family | |
| 120 | Opening Range Was "OpenRange" |
| 121 | Closing Range Was "CloseRange" |
| 122 | First Hour Volume Was "FirstHourVol" |
| 123 | First Hour Volume Was "%percentage" of 10 Average |
| 124 | Market Up "Change from Close" Points |
| 125 | Market Down "Change from Close" Points |
| Alert Family | |
| 126 | Price Approaching Today's High of "TodayHigh" |
| 127 | Price Approaching Today's Low of "TodayLow" |
| 128 | Price Approaching Yesterday's High of "TodayHigh" |
| 129 | Price Approaching Yesterday's Low of "TodayLow" |
| 130 | Price Approaching Last Week's High of "TodayHigh" |
| 131 | Price Approaching Last Week's Low of "TodayLow" |
| 132 | Important Economic Releases Today |
| Limit Family | |
| 133 | Limit Bid |
| 134 | "B" Bid: Limit Bid |
| 135 | "B" Bid: Limit Bid (with BidHandle) |
| 136 | Limit Bid Trading |
| 137 | "B" Limit Trading |
| 138 | Offered at LimitUp |
| 139 | Approaching LimitUp of "LimitUp Price" |
| 140 | Limit Offer |
| 141 | "O" Limit Offer |
| 142 | "O" Limit Offer (with OfferHandle) |
| 143 | Limit Offer Trading |
| 144 | "O" Limit Trading |
| 145 | Bid for LimitDown |
| 146 | Approaching LimitDown of "LimitDown Price" |

FIG. 3D

| MarketDepth Family | |
|---|---|
| 147 | "B" Bid Small; Large Size Bid Below |
| 148 | "B" Bid Small; Large Size Bid Below (with BidHandle) |
| 149 | Small Size at "O"; Large Size Offered Above |
| 150 | OfferSide Upward Depth Air Pocket |
| 151 | BidSide Downward Depth Air Pocket |

FIG. 3E

DYNAMIC PRIORITIZATION OF FINANCIAL DATA BY PREDETERMINED RULES WITH AUDIO OUTPUT DELIVERED ACCORDING TO PRIORITY VALUE

FIELD OF THE INVENTION

The present invention relates to translation of continuously flowing financial data into one or more audio outputs using pre-determined rules.

BACKGROUND OF THE INVENTION

Audio-based financial systems are known. One of the oldest systems provides actual audio commentary of market activity through the use of a person stationed on a physical exchange trading floor who verbally describes market activity by way of a phone headset to clients. Individuals can receive the so-called "squawk" commentary through their phone.

Another known system connects a trader by phone and then communicates with the trader through a series of digital tones. Static stock quotes may be requested and then provided through the use of a voice synthesizer. A different system permits traders to monitor select stock financial parameters such as market price and comments concerning volumes, actors and trends using both audio and visual formats. An alternative approach known in the art provides information such as financial pricing information using a speech synthesizer. Instructions may be keyed in by a user concerning trigger points. Then the system will call the user and provide information using the voice synthesizer when the trigger point is activated by market activity.

Thus, financial data systems are known that calculate and alert a client to technical indicators, time reminders, and price formations in visual or audio formats. However, each of these known systems has significant drawbacks. While information may be provided aurally, steps have not been taken to maximize the amount of data flow. While different indicators and messages may be provided, the indicators and alerts are only generally useful to make a user aware of isolated discontinuous events. They cannot convey information on the properties of the event such as its relative importance or magnitude in comparison to other events. Nor is there an ability to provide information on numerous events simultaneously.

SUMMARY OF THE INVENTION

The present invention is directed to a financial data system that receives real-time financial data using a data reception module and uses a pre-determined set of rules to normalize and prioritize the data, and to provide a priority value to the data. A first set of variables is provided in the data and a second set of variables is calculated using the first set of variables. The first and second sets of variables are then used to generate a listing of possible verbal comments ranked by the priority value. The possible verbal comments may be word or tone related.

Once prioritized, a sub-set of the data is broadcast using a plurality of audio channels. In a preferred embodiment, at least one audio channel plays background sounds while a second audio channel broadcasts specific comments ranked according to the priority value.

To deliver at least a subset of the data, the invention envisions the use of a took-up table of pre -recorded comments, the use of a voice synthesizer, and the use of live audio streaming.

A key aspect of the invention is the manipulation of selected verbal comments before delivery using volume or vocalization compression corresponding to the priority value of each verbal comment. If necessary, while a current verbal comment is being delivered a higher priority new verbal comment may either override the current verbal comment or result in the addition of another audio channel.

In a preferred embodiment of the invention, the pre-determined rules include a decay value that affects the priority value of the possible verbal comments with each successive calculation of the second set of variables and the listing of the possible verbal comments.

As a result of a combination of multiple audio channels, volume control, vocalization compression, and selective overriding, a tremendous amount of real-time financial information may be delivered to a user. Market events with greater significance and an accompanying louder sound or compressed delivery can be easily distinguished from events of lesser significance with lower volume and no vocalization compression. Mono-volume and non-compressed audio delivery systems are useful to make a user aware of isolated, discontinuous events. However, such systems can only alert a user that some event has occurred. Unlike the present invention, they cannot convey information on the properties of an event, such as its magnitude as part of a delivery system of numerous such events simultaneously.

In accordance with the present invention possible applications include audibly conveying buy and sell activity along with associated trade size; playing a background sound of an actual trading pit that is varied in volume to reflect the level of current trading volume; and reflecting the bullishness or bearishness of all the buy and sell orders in a market, commonly referred to as market depth.

BRIEF DESCRIPTION OF THE DRAWINGS

The features and inventive aspects of the present invention will become more apparent upon reading the following detailed description, claims, and drawings, of which the following is a brief description:

FIGS. 3A through 3E represent a sample lookup table of pre-recorded market comments that have been subdivided into families of related comments.

DETAILED DESCRIPTION OF A PREFERRED EMBODIMENT

Figure 1:
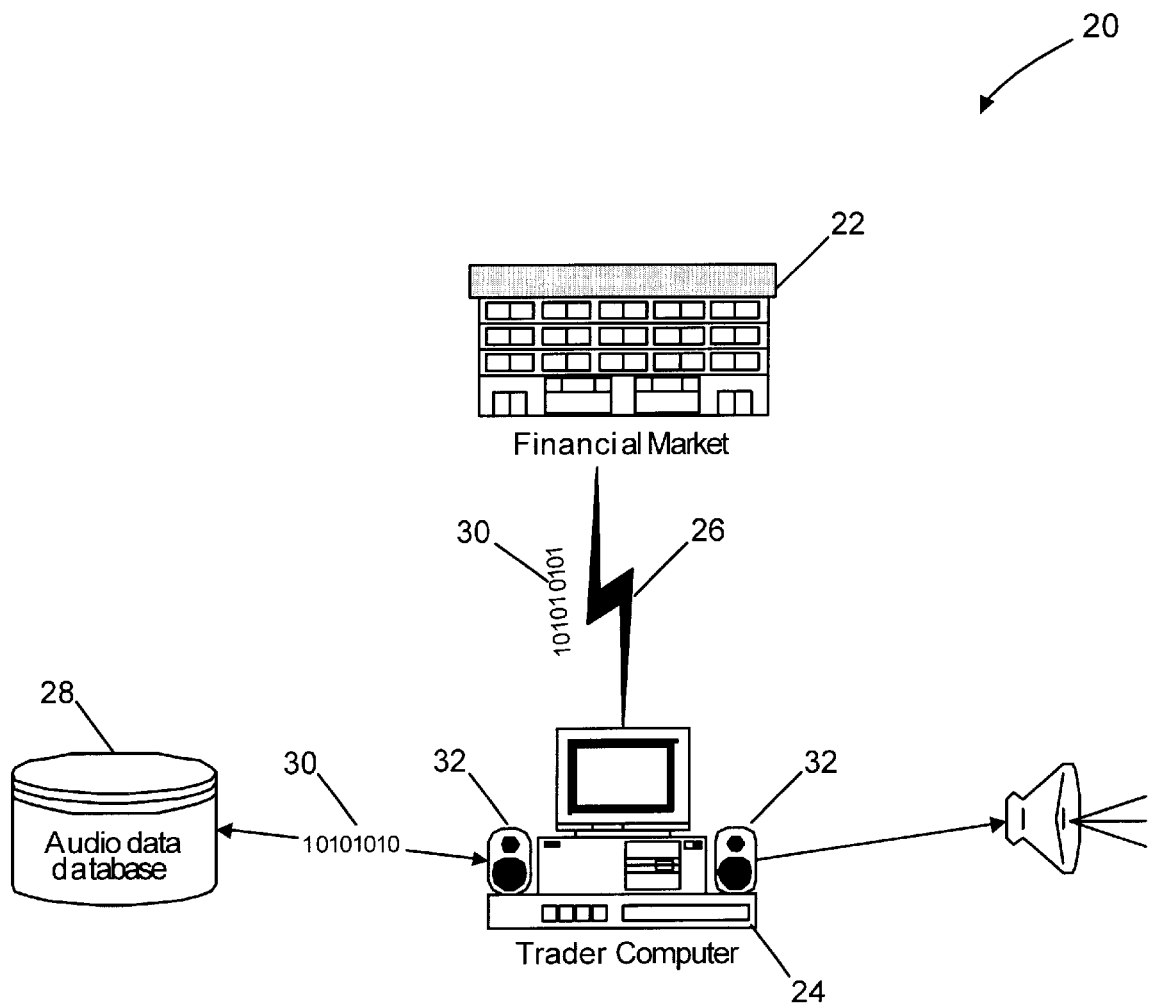
FIG. 1 is representation of an audio financial data system according to the present invention.

A financial data distribution system 20 is illustrated in FIG. 1. It includes a financial mardet 22 with trades taking place in real time and a trader computer 24 connected to the financial market 22 by way of a communications link 26. Computer 24 includes an audio data database 28 that contains market data 30 transmitted from market 22 and stored according to pre-determined rules. Data arriving from financial market 22 or already stored in database 28 is compared according to the predetermined rules and selectively broadcast using computer-based speakers 22.

A key feature of system 20 is to convert data 30 into continuous audio commentary and sound corresponding to verbal comment and sound understandable to traders, investors, and other market participants interested in aurally following market activity.

The audio output is delivered in two distinct formats, which may be played simultaneously or independently using a plurality of different audio channels. The first format is actual human language comments best describing or summarizing recent market data that may either use pre-recorded audio as discussed further below, a text to speech synthesizer, or streaming audio. The second format is pre-recorded background sound (e.g. the sound of traders on an exchange floor) that is a representational abstraction of changing market activity for which simple audio comments do not suffice.

The effect of combining both audio formats simultaneously is to give a comprehensive "feel" or "sense" of market activity. The invention is a significant improvement over common visual input, since market conditions can change faster than the human eye can process the changes flickering on a screen. It is also an improvement over single channel, mono volume sound alert systems since the amount of audio data transfer to the user is faster and more complete. The final effect is a live audio commentary and audio sensation of current and changing market activity.

Figure 2:
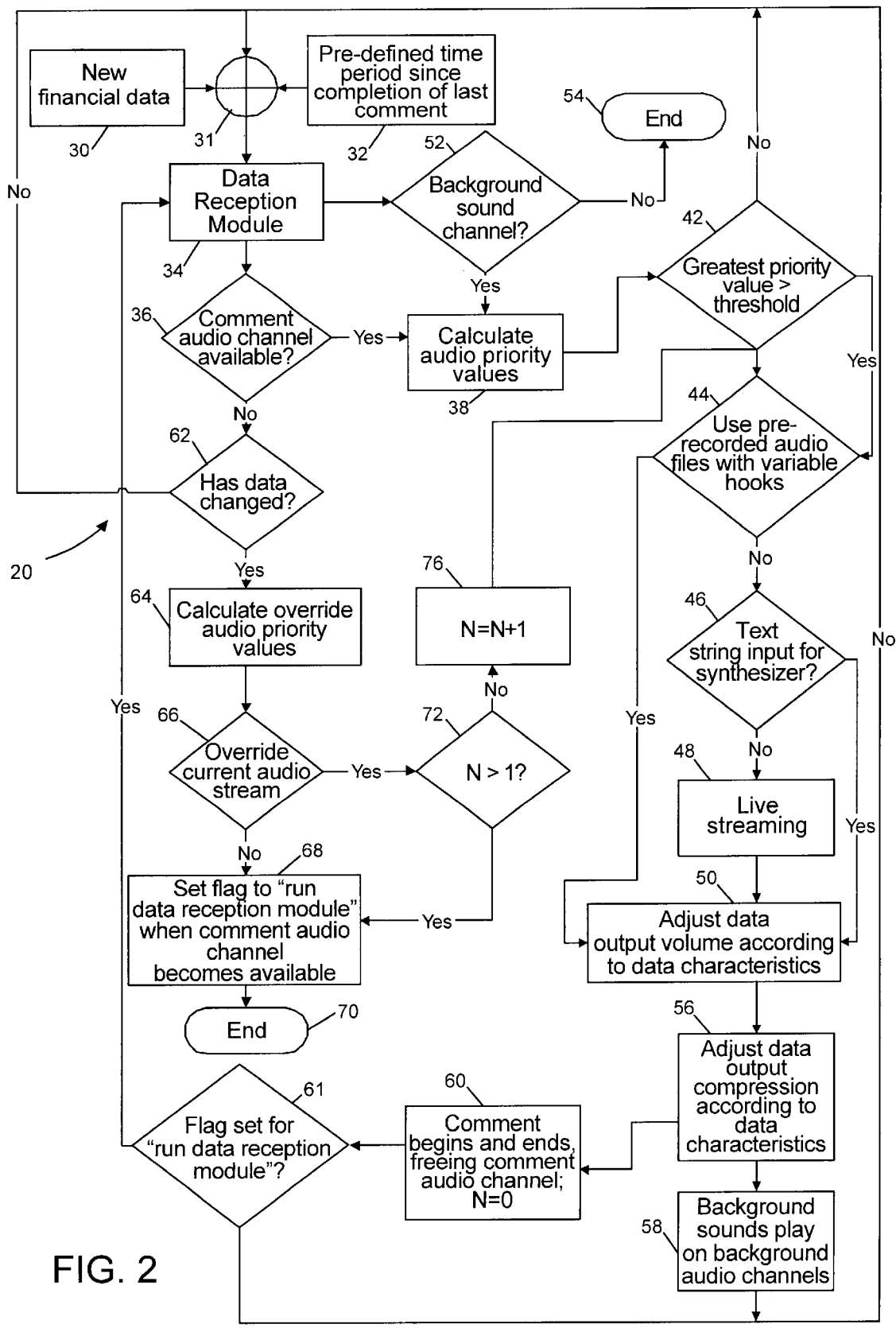
FIG. 2 is a flow chart showing the operation of the audio financial system.

The flow of data 30 is described in greater detail in FIG. 2. First, a variable N, discussed in greater detail below, is initialized to 0. At a wait point 31, system 20 waits for either new financial data 30 or a pre-defined period of time since completion of a last comment 32 before passing control to a reception module 34. Typically, a pre-defined time period is chosen to reduce processing load. However, if it is desired for system to cycle continuously then the time period may be set to zero. Alternatively, if system 20 is only to run if new financial data 30 is received, then the time period may be set artificially high. In general, the purpose of having a pre-defined time period is to permit the controlled broadcast of lower priority comments even if no new financial data 30 is received.

In a preferred embodiment, data 30 includes a first set of variables with the following characteristics:
a. Bid Prices
b. Bid Sizes
c. Offer Prices
d. Offer Sizes
e. Last Trade Price
f. Last Trade Quantity
g. Total Trade Quantity
h. Associated underlying cash price (if applicable)
i. Data time-stamp The variables associated with data 30 are stored in arrays in database 28 by data reception module 34 along with previous values of these same variables. Then a second set of additional variables is calculated using data 30. These additional variables include:
1. Change in Bid Price
2. Change in Bid Size
3. Change in Offer Price
4. Change in Offer Size
5. Bid—Offer Price Spread
6. Change in Bid—Offer Price Spread
7. Change in Total Trade Volume
8. Traded Price Range (low to high)
9. Range High Price
10. Range Low Price
11. Largest volume single trade
12. Buy-side volume
13. Offer-side volume
14. Trading velocity index
15. Cash-Futures Basis Value
16. Change in Basis Value The calculated variables associated with data 30 are also stored in arrays in database 28 by reception-module 34 along with previous values of the same variables. The variables are then normalized to values between 0 and 1 to bind the potential range of the values of the priorities of the comments.

Next, a determination is made at decision point 36 if a comment audio channel is available. If a comment audio channel is available, then data 30 is prioritized at point 38 using a logic engine or decision matrix. The logic engine sorts and sifts incoming data 30 based on a prioritization system derived from what is the most crucial and relevant data for market participants. For example, the logic engine uses the data inputs to analyze, sort, and prioritize price levels, changes in price levels, speed of change of price levels, trading volume, change in trading volume, flow of activity, timeframes, statistical, technical and other relevant numerical financial indicators and events to determine the appropriate audio comments, sequence of audio comments, and manner of delivery of the audio comments based on the generation of priority values corresponding to the data. To save on processor computational time, it is generally preferred that not all potential equations be solved unless certain criteria are met. Preferably, the maximum value of the priorities is approached asymptotically. The normalized values along with the most recent real-time variables (e.g., a–i above) are then used to calculate the priority value of each comment.

To determine which comment best describes recent market activity it is necessary to first define the market comments. One possible lookup table of pre-recorded market comments is reproduced in FIGS. 3A through 3E. The sample market comments are subdivided into families of related comments including: Bid Family (with subfamilies Simple Bid, Bid with Size, Qualitative BidSize, Dynamic BidSizeUp, Dynamic BidSize Down, DeltaBid Price Up, DeltaBid Price Down, and Bid-Offer Combo Quote); Offer Family (with subfamilies Simple Offer, Offer with Size, Qualitative OfferSize, Dynamic OfferSizeUp, Dynamic OfferSizeDown, DeltaOffer Price Down, and DeltaOffer Price Up); Trade Family (with subfamilies Simple Trade, Simple Trade with Size, Qualitative Trade Conditions, Up Direction Trade, and Down Direction Trade); Basis Family; Time Family; Summary Family; Alert Family; Limit Family; and Market Depth Family.

The priority value of each of the market comments is then defined by an equation involving mathematical combinations of pre-defined variables such as those listed above, as well as some additional special variables. One special variable is the "decay rate." A comment's decay rate helps determine how often a comment is reported. The priority value of a recently vocalized comment is decreased to reduce the probability of a comment becoming too repetitious. The amount by which a recently vocalized comment's priority value is decayed is typically exponentially reduced over time although other types of decay rates may also be used. Typical comments are assigned a fast decay rate, and therefore, reported more often. Unusual comments that should be reported less frequently are assigned a slow decay rate. Sometimes comments are even assigned a negative decay rate, and actually increase in importance over time. Another special variable is the relationship of a comment to other comments. The comment relationship variable is an important factor for increasing or decreasing the priority of comments following the recently vocalized market comment(s).

The highest priority comment for a given audio channel is the comment with the highest resulting priority value. This is the comment that is aurally reported or vocalized as shown below.

Simplified Example of Comment Generation

The following examples are simplified to demonstrate a preferred method of generating market comments and assigning multiple audio output channels. To simplify this process, the number of potential market comments has been reduced to 1) Simple Bid Comment and 2) Simple Offer Comment. Further, the comment priority equations have been simplified to their core variables. Thus, for this example the simplified priority equations are:

Bid Comment=N[absolute value(current bid−previous bid)]−Bid Comment Decay Value+Bid Comment Previous Comment Relation.

Offer Comment=N[absolute value(current offer−previous offer)]−Offer Comment Decay Value+Offer Comment Previous Comment Relation.

Below is a list of Notations, Definitions, and Assumptions for use with the two equations:
1. N[ ]=normalization of data in brackets. Normalization can be achieved through various algorithms with the intent of bounding the values of input.
2. Normalization Equation. In the examples to follow the normalization equation will be: Variable/(Variable+3).
3. Bid Comment. A comment that states the price at which a potential buyer is willing to pay.
4. Offer Comment. A comment that states the price at which a potential seller is willing to sell.
5. Trade Comment. A comment that states the price at which something (stock, bond, financial or commodity product) has traded.
6. Size (or Volume). The quantity of something that has been bid for, offered, or traded.
7. Decay Value. As shown in the above Priority Equations, a comment's priority value is always reduced by its Decay Value. Whenever a comment has been vocalized its Decay Value is increased by a predetermined amount (the Decay Constant), reducing its priority to be said again. The "current" calculation cycle Decay Value is decayed by an algorithm (using a Decay Factor) and based on a time interval, or whenever a comment is selected for vocalization. The simplified equation used for calculating a comment's decay value for each new calculation cycle follows:

New Decay Value=(Previous Decay Value+Decay Constant (if applicable))*Decay Factor 8. Decay Constant. The Decay Constant is added to a comment's Decay Value after a comment has been vocalized. If a comment is not vocalized in the current calculation cycle, then the Decay Constant will not be added to a comment's Decay Value for the next calculation cycle.
9. Decay Factor. Usually less than 1 and greater than or equal to zero. The Decay Factor is multiplied by a comment's Decay Value after a specified time interval or after a comment has been selected for vocalization in order to exponentially reduce a comment's Decay Value. Thus, as the system moves forward in time through new comment cycles the ability of the Decay Value to suppress a comment is reduced.
10. Previous Comment Relation. As shown in the above priority equations, this variable is added to the priority equation value. When a comment is said it is often the case that another comment (or type of comment) should follow next. For example, if a bid comment is said then an offer comment should usually follow, unless newly received higher priority data takes precedence. For example, to increase the priority of an offer comment being said after a bid comment, the Previous Comment Relation variable in the offer priority equation is increased. In addition, some Previous Comment Relation variables will be influenced by comments made previous to the last comment, such as a sequence of comments.
11. Over-ride. The ability to stop a currently playing comment and play a higher priority comment.
12. Value Assignments for this example:
   When a Bid Comment is vocalized the Offer Comment's Previous Comment Relation Value=0.1; otherwise=0
   When an Offer Comment is vocalized a Bid Comment's Previous Comment Relation Value=0.1; otherwise=0
   Decay Constant=0.25 (for both bid and offer comment equations)
   Decay Factor 0.75 (for both bid and offer comment equations)

| | | |
|---|---|---|
| Market open: | 120 bid | 130 offer |
| First update: | 122 bid | 130 offer |
| Second update: | 125 bid | 130 offer |
| Third update: | 122 bid | 127 offer |

Using the above information, the equations provide the following results:
First Update
   Bid Comment=N[122−120]=2/(2+3)=0.4
   Offer Comment=N[130−130]=0
Note that the Decay and Previous Comment Relation variables are all set to zero since this is the first comment of the day.
   The Bid Comment value is higher, therefore the comment said is: "122 Bid".
   Now calculate the Previous Comment Relation to be used in the next calculation cycle:
   Bid Comment Previous Comment Relation=0
   Offer Comment Previous Comment Relation=0.1 (Since Bid was just vocalized)

Now calculate the Decay Values to be used in the next calculation cycle:

Bid Comment Decay Value=(0+0.25)*0.75=0.1875

Offer Comment Decay Value=(0+0)*0.75=0

Second Update

Bid Comment=N[125−122]−0.1875+0=3/(3+3)−0.1875= 0.3125

Offer Comment=N[130−130]−0+0.1=0.1

The Bid Comment value is higher, therefore the comment said is: "125 Bid".

Now calculate the Previous Comment Relation to be used in the next calculation cycle:

Bid Comment Previous Comment Relation=0

Offer Comment Previous Comment Relation=0.1 (Since Bid was juse vocalized)

Now calculate the Decay Values to be used in the next calculation cycle:

Bid Comment Decay Value (0.1875+0.25)*0.75=0.328

Offer Comment Decay Value=(0+0)*0.75=0

Third Update

Bid Comment=N[122−125]−0.328+0=3/(3+3)−0.328= 0.172

Offer Comment=N[127−130]−0+0.1=3/(3+3)+0.1=0.6

The Offer Comment value is higher, therefore the comment said is: "127 Offer".

Now calculate the Previous Comment Relation to be used in the next calculation cycle:

Bid Comment Previous Comment Relation=0.1 (Since Offer was just vocalized)

Offer Comment Previous Comment Relation=0

Now calculate the Decay Values to be used in the next calculation cycle:

Bid Comment Decay Value=(0.328+0)*0.75=0.246

Offer Comment Decay Value=(0+0.25)*0.75=0.1875

The updates continue until system 20 stops or data 30 stops.

The simplified example shows how streaming data 30 is analyzed to determine the most appropriate market comment. The inventive methodology is adaptive to changing market conditions. In this example the sequence of comments was: 122 Bid; 125 Bid; and 127 Offer. Under normal circumstances it would be appropriate for an offer comment to follow a bid comment. However, in the example, the second market comment was another Bid comment, not an offer comment. Therefore, the inventive system allows for intelligent flexibility in reporting information to a market listener. This is especially important when the system includes hundreds of potential comment equations along with the rigors of real-time, real-world market data.

Data Broadcasting

Once the priority values for all potential commentary equations have been calculated at point 38, at decision point 42 a determination is made if the highest priority comment of the analyzed time interval falls below a minimum threshold value. If it does then no comment will be made. System 20 will return to wait point 31 for new financial data 30 or a predefined time period since completion of the last comment 32.

If the priority value of the highest priority comment is greater then the minimum threshold, at decision point 44 a determination is made if pre-recorded audio files are to be used with optional data hooks (e.g., the insertion of numbers is following a pre-recorded statement) to broadcast specific variables associated with the data. Alternatively, at decision point 46 if data 30 is in text format, a speech synthesizer may speak the data. Otherwise, live streaming of the data is assumed at point 48. The use of pre-recorded audio files, speech synthesizers and live streaming are examples of data delivery means for converting data 30, as calculated, into verbal comments or tones.

Comment Delivery Using Volume Control

At point 50 the volume of the audio stream may be automatically adjusted without user intervention according to data characteristics. As an alternative to increasing data output volume, different pre-recorded audio files may contain the same data, but have been recorded at different volumes.

By automatically adjusting the volume setting of a reported comment, more important market information can be aurally distinguished from less important information. For purposes of providing an example, relevant information from the earlier example follows:

| Update # | Winning Comment | Priority Equation Value |
| --- | --- | --- |
| First Update | "122 Bid" | 0.4 |
| Second Update | "125 Bid" | 0.5 |
| Third Update | "127 Offer" | 0.5 |

The Priority Equation Value excludes the variables Decay Value and Previous Comment Relation. These variables are not used in this calculation because they are important for guiding the sequence of comments, but not in Valuing a comment's absolute priority for the purpose of delivery.

As a result of the normalization process discussed earlier, the volume level equation for all comments must always be between 0 and 1 (0<=Value<=1). The normalization equations are designed so that average market data results in a priority equation value in a pre-determined value range.

The two most basic ways to automatically set volume levels for a vocalized comment are (1) threshold value volume assignment (discontinuous model), and (2) unique volume assignment (continuous model).

The discontinuous model will set the volume output of market comments to a normal pre-determined volume level. Then, if a winning comment has a priority equation value above a specified threshold level, the volume level of this comment's vocalization will automatically be set to a higher level.

Figure 4:
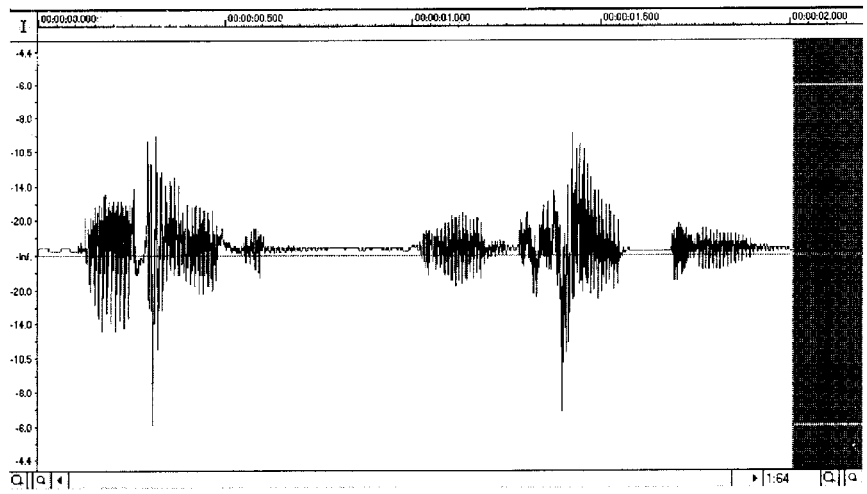
FIG. 4 is a graphical image of an audio wave for a market comment with baseline parameters (i.e., normal volume and no time-compression).
Figure 5:
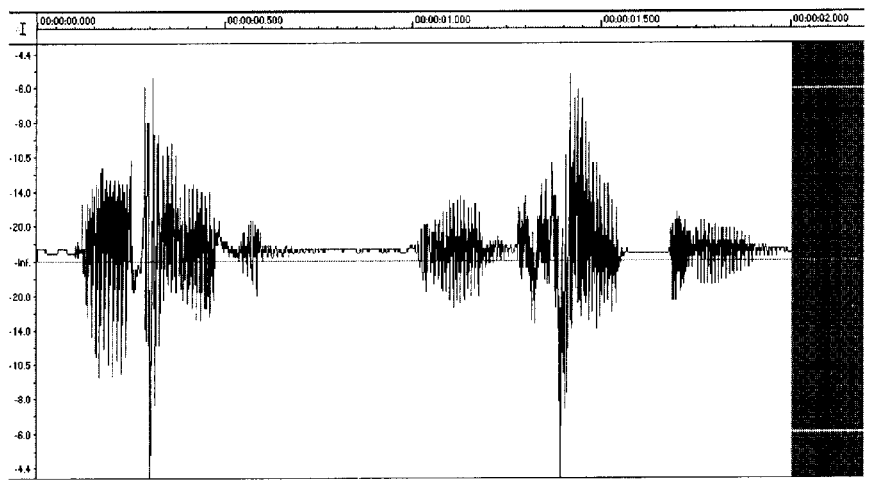
FIG. 5 is a graphical image of an audio wave for a market comment with higher volume output (150% of normal volume with no time-compression).
Figure 6:
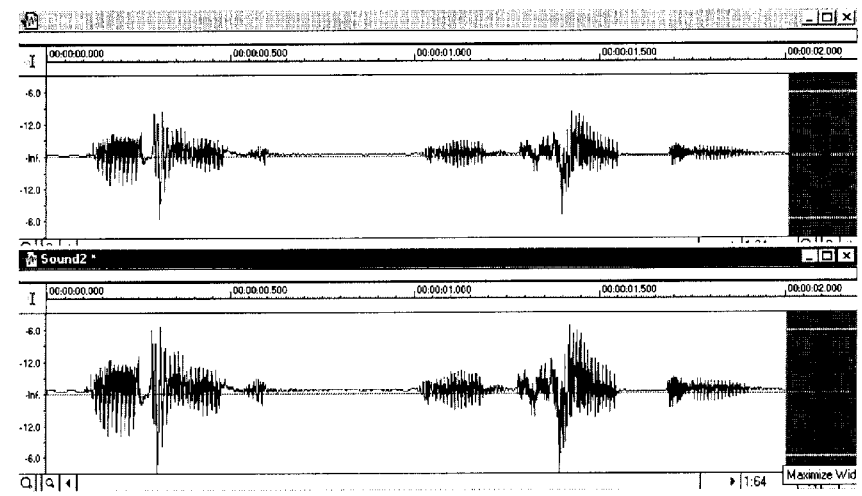
FIG. 6 is a graphical image of an audio wave for a market comment comparing a baseline volume and a higher volume output of 150% for the same comment.

For example, the threshold level for higher volume vocalizations may be set to a priority equation value of 0.5 or greater. A Priority Equation Value of 0 to 0.49 would have a normal baseline volume while 0.5 to 1.0 could have a volume setting of 150% of the baseline volume. Using the data generated above, the first update's comment has a priority equation value of 0.4. Thus, it will be vocalized at a normal baseline volume level. FIG. 4 shows a graphical image of the wave pattern of a market comment reported at a normal baseline volume. The second and third market updates' comments each have priority equation values of 0.5, triggering the higher threshold volume setting. Therefore, the second and third market comments ("125 Bid" and "127 Offer") will be broadcast at a higher volume output level, 150% of normal. FIG. 5 shows a graphical image of the wave pattern of the same market comment shown in exhibit #1, but vocalized at 150% of normal baseline volume. FIG. 6 presents a direct graphical comparison of the two different volume levels. Of course, there also could be a series of threshold levels for multiple volume assignments.

The second basic way to automatically set volume levels for market comments is by continuous volume assignment. By way of continuous volume assignment, a unique volume level is set for each distinct priority equation value. Assuming that the baseline volume is set at 100%, every time a winning comment has a priority equation value of 0.5 the volume could be set to 150% of normal baseline volume. Every time a winning comment has a priority value of 0.3 the volume could be set to 103% of normal. Finally, every time a winning comment has a priority value of 0.2 the volume could be set to 91.3% of normal.

Essentially, volume levels are assigned to winning market comments as a continuous function. Using the same type of normalization equation used in the priority equations, each priority value has a unique volume assignment. Furthermore, the minimum and maximum volume levels can be pre-selected. For example, the minimum volume level could be 50% of normal and the maximum volume assignment could be 250% of normal. The volume assignment extremes are approached asymptotically as described by a graphical image of the normalization equation. Moreover, different types of market comments (Bid Family, Trade Family, etc.) can include different volume assignment normalization equations.

Figure 7:
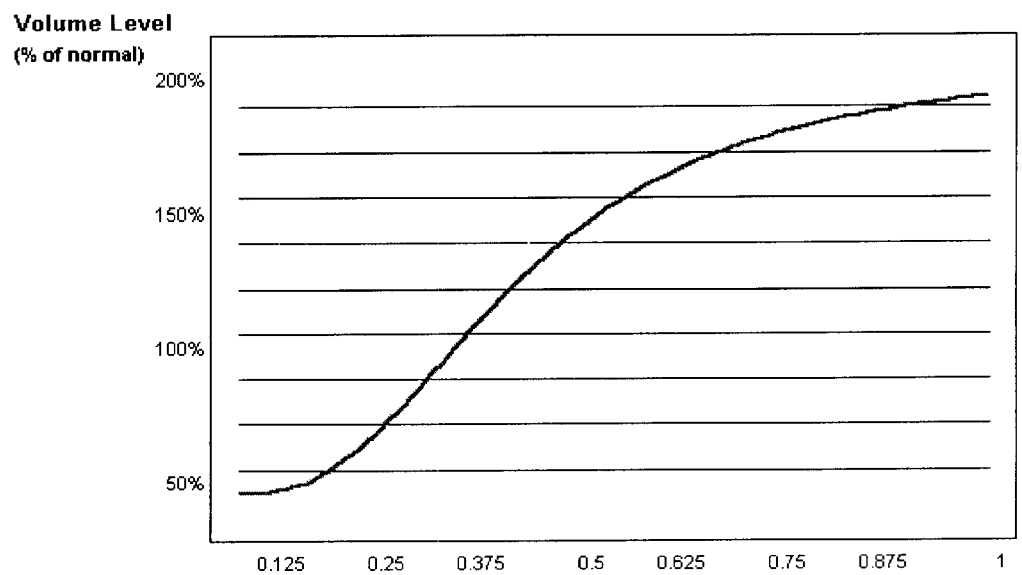
FIG. 7 is a graph of a market comment continuous volume assignment function with volume level (% of normal) as a function of the market's frequency value.

An example of using continuous volume assignment as applied to individual market comments is shown in FIG. 7. The volume level is on the Y-axis and the Priority Equation Value is on the X-axis. Winning comments with higher priority values will be assigned higher volume levels, as defined by the function graph. Volume levels are assigned in a continuous manner. Each specific priority value returns a unique volume level assignment.

Data Delivery Using Background Sounds

Background sound is simply a way to help re-create the activity and feel of a real trading floor. For example, one or more separate audio channels may play or broadcast pre-recorded trading floor activity, which captures the yelling, screaming and trading of an exchange floor, or any other sound of interest in a continuous loop. At the same time that data reception module reviews data 30 and determines if a comment audio channel is available at decision point 36, it also determines if one or more background sound channels are to be used as shown at decision point 52. If yes, then the audio priority values are calculated for the background sounds at point 38 as discussed above except that different pre-determined rules are applied for the background sounds as opposed to the comments, and the system continues as described. If no, then background sound is not used, terminating at point 54.

The most important element of the background sound is typically the automatic adjustment of the output volume. The volume level is varied based on the frequency and size of market activity. An increase in market activity automatically increases the volume of the background sound, while a decrease in market activity automatically decreases the volume. Essentially, the background sound is an audio abstraction of changing market activity. It adds to, and enhances, the information given in simple market comments.

Volume control for background sound is adjusted based on a combination of market data, such as number of trades, trade volume, new bids, and new offers, per time interval. The data is normalized, used in an exponential moving average calculation, and then used to assign a volume level. A moving average is used to smooth out the volume changes so that a brief spike in market activity will increase the volume, but not unduly so.

Figure 8:
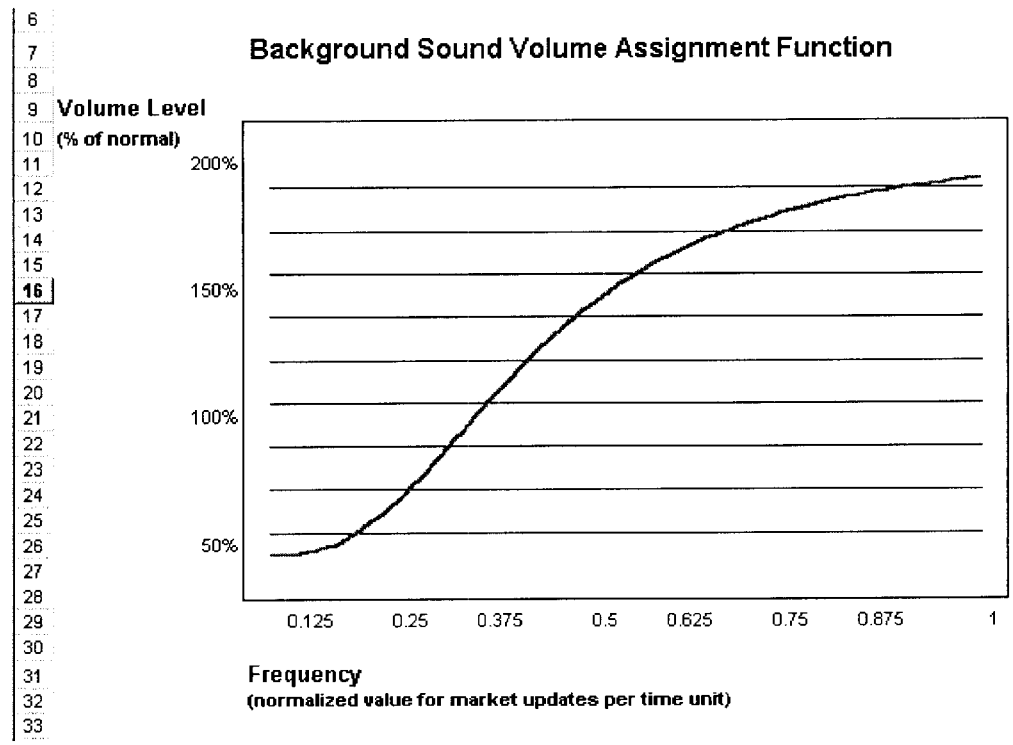
FIG. 8 is a graph of a background sound volume assignment function with volume level (% of normal) as a function of the market comment's priority equation value.

An example of a continuous volume assignment for background sound is shown in FIG. 8 where the volume level is on the Y-axis and the Frequency Value is on the X-axis. While there are many different possible shapes for the function assignment graphs, FIG. 8 shows a continuous curving function where the extremes are approached asymptotically. In some cases it may be desirable to use a more simple straight-line function with the upper and lower extremes chopped off. As can be seen from FIG. 8, the higher a market's frequency value the higher the background sound's volume assignment. The moving average of the normalized frequency values is bounded between 0 and 1 on the X-axis. Furthermore, the volume assignment level is bounded between 50% of normal and 200% of normal on the Y-axis. Using this function equation, a normal volume (100%) is applied with a market's moving average frequency value of approximately 0.375 (⅜).

An example of how the Priority Equation Value for background volume may be calculated uses the same data as for the example above, but includes another variable called frequency, which is defined as the number of market updates per time interval. The table below shows the hypothetical values for the frequency variable immediately after the reception of a new market update.

| Update # | Bid | Offer | Frequency |
| --- | --- | --- | --- |
| Market open: | 120 bid | 130 offer | 1.0 |
| First update: | 122 bid | 130 offer | 1.5 |
| Second update: | 125 bid | 130 offer | 2.1 |
| Third update: | 122 bid | 127 offer | 3.0 |

The frequency variable is monitored and tallied in the data-reception module 34. Then, it is normalized in order to bind its value between 0 and 1. An exponential moving average of the normalized frequency variable is calculated as shown in the following chart:

| Update # | Frequency | Normalized Value (1) | Exponential Moving Ave. (2) | Volume Assignment (3) |
| --- | --- | --- | --- | --- |
| Market open | 1.0 | 0.25 | N/A | Baseline Normal |
| First update | 1.5 | 0.33 | N/A | Baseline Normal |
| Second update | 2.1 | 0.41 | 0.35 | 110% Baseline |
| Third update | 3.0 | 0.50 | 0.44 | 124% Baseline |

(1) Normalization equation = variable/(variable + 3).
(2) Moving Average ("MA") Calculation. In the example a 3 period exponential moving average is used. MA = ((recent var * 3) + (prev. var * 2) + ($2^{nd}$ prev. var * 1))/6. In reality, other moving average methods may be used. In practice, until there is enough data to calculate 3 period moving average the baseline volume is assigned until MA moving average is available.
(3) Volume level assignment is done using a continuous normalization function as discussed above.

As the frequency of market activity increases so does the volume of the background sound. A listener can easily hear that the market is getting more active. In addition, the results of the background sound's volume level assignments can also be used to set the volume level for the individual market comments.

Finally, there is another type of background sound. Such background sounds are typically played on a second or third background sound audio channel. The second type of background sound assigns abstract sounds, such as beeps, whistles, musical notes, or words such as "bought" or "sold" to various market activities. When a specific market activity (trade on offer side) occurs, the activity's assigned sound (e.g., "whistle" or "sold") is played. Controlling the volume of the sounds can convey the magnitude or importance of the specific market event. The volume level assignments are calculated in an identical manner to the method described for comment volume above. There are many market situations where a brief sound conveys maximum information in minimum time, especially with the volume control feature. This type of background sound provides a fast and efficient way to convey information to market participants.

In summary, the idea of automatic volume control is to quickly convey the relative importance of market information. If a market is quiet or normal then comments will be reported with normal volumes. When something important happens, say a large increase in the bid size, a big increase in the bid price, or even a large transaction, then a user will quickly hear that the market update is important, and should be noted. The volume will be louder. This is a dramatic improvement over traditional quote machines, or steady volume quote reports.

Comment Delivery Using Vocalization Compression

Another way to convey the relative importance of information in addition to sound volume is through sound compression. As shown at point 56, the data output delivery time may be compressed according to predetermined data characteristics. In some cases, the compression may be used to increase pitch. In other cases, it may be desirable to maintain pitch even as its delivery time is decreased. Rather than compressing the data output time itself, pre-recorded audio files may have been recorded at different compression rates.

Figure 9:
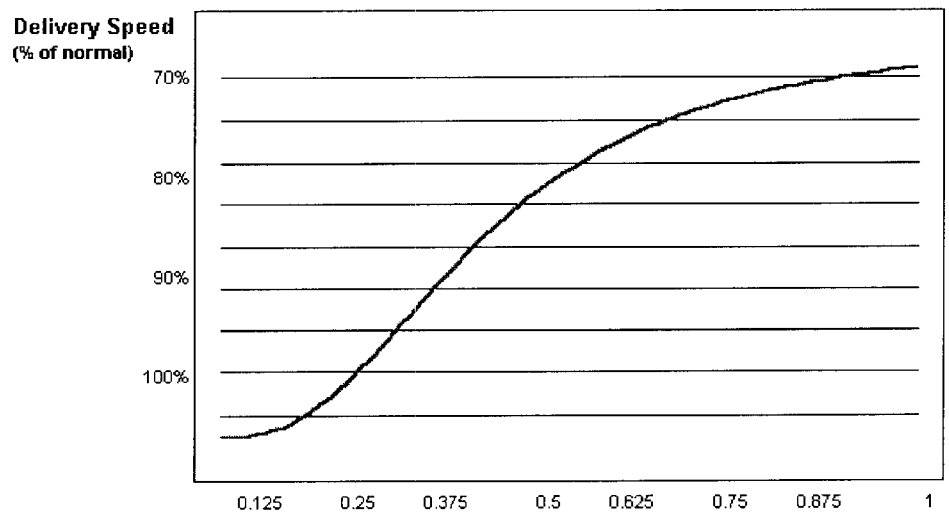
FIG. 9 is a graph of a market comment continuous time-compression assignment function with delivery speed (% of normal) as a function of the market comment's priority equation value.

As with volume control, sound compression may be either continuous or discontinuous. FIG. 9 shows an example of a continuous function that may be used for determining the delivery speed (time-compression) of an individual comment. The X-axis shows the comment's priority equation value (normalized and excluding the Decay Value and Last Comment Relation variables as discussed above because these variables are only useful in guiding the sequence of comments, but not in valuing a comment's absolute priority). The Y-axis shows the delivery speed assignment with values bounded from normal (100%) up to 70% faster than normal. For priority values below 0.25 the result is a slower than normal delivery speed. In practice, however, the slowest allowable delivery speed will typically be normal delivery speed.

A methodology similar to the generation of background sound as discussed above can control the amount by which a comment's speed is increased. Alternatively, a comment's vocalization speed can be adjusted based on calculations similar to the main decision algorithm.

A simplified example of how to use time-compression relies on the market data provided above, as well as the frequency variable introduced for the explanation of background sound. For purposes of the example, a discontinuous threshold method is used where a threshold frequency is set at 3.0 or greater for activating time-compression at a level of 75% compression.

Once again, the following data 30 arrives into the data reception module 34 and calculated according to predetermined rules as follows:

| Update # | Bid | Offer | Frequency | Market Comment |
|---|---|---|---|---|
| Market open: | 120 bid | 130 offer | 1.0 | |
| First update: | 122 bid | 130 offer | 1.5 | "122 Bid" |
| Second update: | 125 bid | 130 offer | 2.1 | "125 Bid" |
| Third update: | 122 bid | 127 offer | 3.0 | "127 Offer" |

For convenience, each update interval's winning market comment is shown in a separate column. As illustrated, at the time when the first and second comments were generated the frequency variable was below 3.0. Therefore, both the first and second comments are vocalized at the baseline, or normal, delivery speed as shown in FIG. 4.

Figure 10:
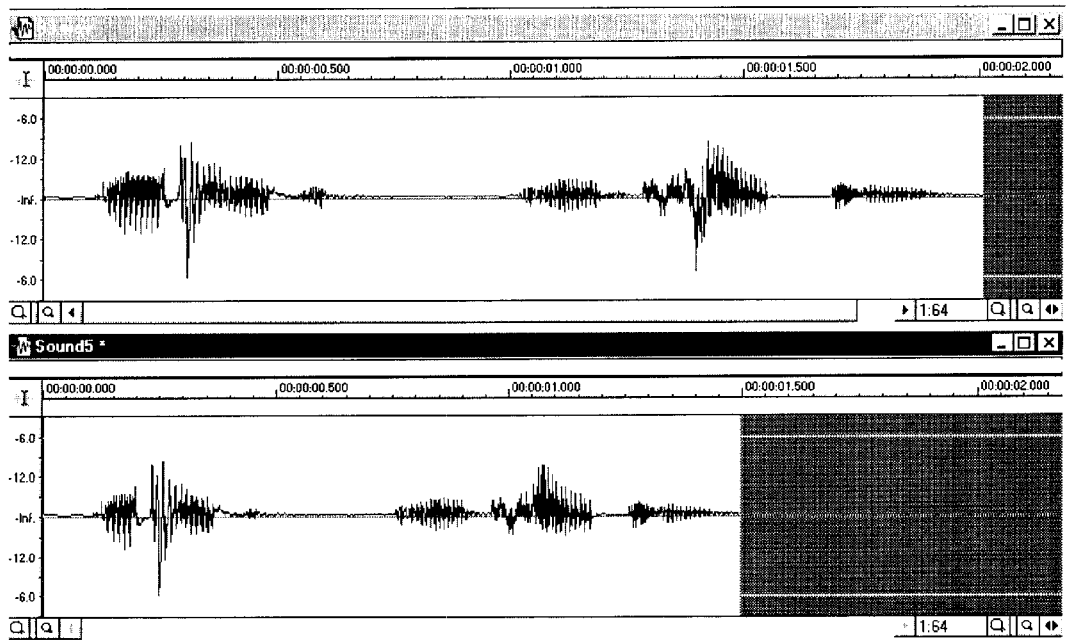
FIG. 10 is a time compression comparison graph of audio waves for market comments where the comment in the top image is at normal speed and the comment in the bottom image is subject to 75% time compression.

But then the situation changes. Market activity increases. By the time the third update's comment is generated, the frequency variable is 3.0, above the time compression threshold level. Therefore, the market comment of "127 Offer" is reported at a faster pace (without changing the pitch) such that it is time-compressed to 75% of the original delivery speed. FIG. 10 presents a direct graphical comparison of the two different delivery speeds.

By reducing the audio report time to 75% of normal, the system is available sooner, to vocalize the next market update. Moreover, the listener can hear that the pace of activity is increasing and thus better prepare for action.

In summary, the volume and data compression values are preferably determined as follows. Before actual vocalization, the highest priority comment's absolute equation value is compared with the equation value of other recent winning comments, and to a set of relative values. A volume level or data delivery rate for the highest priority comment is calculated from the comment's relative value. This volume level or data delivery rate assignment will be used to control the mode of the comment's vocalization. Relatively more important comments will be reported at a louder volume level and/or at a higher rate of data delivery. Less important comments will be reported at a lower volume level and/or a lower rate of data delivery. Although a comment may be the highest priority for the latest analysis interval it may not be an important comment in general. This method of volume and data delivery flow control allows for the "highlighting" of more important market information.

The use of volume control and data delivery time compression are important features of the invention. Moreover, they are examples of data manipulation means to alter an aural delivery of verbal comments according to priority values. Market events with greater significance and an accompanying louder sound or compressed audio can be easily distinguished from events of lesser significance and a quieter sound or uncompressed audio. Since traders are overwhelmed with information, most of which is visual, varying sound volume and data delivery compression provide a powerful way to focus a trader's attention on events of greater significance. Thus, a trader's energy and concentration can be conserved for when it is needed in a busy market by being able to relax during slower periods and the accompanying low volume sound and uncompressed data flow. Without varying sound volume, traders have to either constantly watch the screen for market activity (which is exhausting to do all day long) or use a basic mono-volume system, which have limited utility.

Mono-volume alerts are useful to make traders aware of isolated, discontinuous events. However, mono-volume alerts can only alert traders that some event has occurred. They cannot convey information on the properties of the event, such as its relative importance or magnitude. In contrast, by varying the sound volume or compressing the delivery of an audible alert, the properties of an event can be conveyed to traders. This profoundly improves the usefulness of any audible alert.

For example, it is generally not useful and usually distracting to have a mono-volume alert beeping every time a common event occurs, such as buy orders being added to the current best bid. The only information being conveyed is that the event continues to occur. If the event is common and occurs often, this information is of little value to a trader and would be delivered at the expense of potentially distracting the trader. For this reason, mono-volume alerts are usually not used for commonly occurring events. Alternatively, an audible alert system in which an event's magnitude is algorithmically converted to a beep's volume or a compressed delivery of the beep can provide useful, continuous information, such as the frequency and size of the orders being added to the bid. This is valuable information to a trader, converting the potentially distracting beep into a meaningful continuous measure of a market's current state. Since the trader is receiving the information from the combination of audible alerts and changing volume levels he is free to visually concentrate on other areas of his trading screen. High concentrations of real-time data can be audibly conveyed to traders by carefully choosing the events to which sounds are assigned and properly designing their volume algorithms.

Additionally, by varying sound volume, information can be audibly conveyed to traders faster than a human can possibly verbally convey it. For example, assume a market trades 5 times on the bid in one second. Three trades were small in size, one was medium in size, and one was large. It is important for the trader to know all of this information. Yet, it is very difficult for a human voice to accurately explain it in that second. By assigning a beep to trades on the bid and algorithmically converting the size of the trades into the volume level of the beep or by compressing the delivery of the beep even a blind trader can easily follow what just occurred (e.g., "Beeeeep, Beeeeep, Beeeep, Beeep, Beep", where both sound volume is increased and the delivery time is compressed).

Moreover, by assigning a lower pitched tone to trades on the bid and a higher pitched tone to trades on the offer, a trader is able to follow all trades that occurred in a market. This is not currently feasible even if a trader constantly stared at the "last trade" and "last trade volume" portion of a trading screen—the visual updates flash by too quickly to all be read, and if they aren't read there is no impression.

Alternatively, the varying volume beeps in combination with data compression allows all of the trading activity to be heard, understood and acted upon. Additionally, if the trader were forced to stare at the "last trade" and "last trade volume" portions of his screen he wouldn't be looking at the bid and offer and therefore couldn't effectively trade at this time (because he wouldn't know what price he was buying or selling). Thus, the invention immerses the trader much more deeply into the trading activity.

Specific applications of both volume and data delivery time compression include the following:

Audibly conveying the buy and sell activity and the associated trade size through different tones or words such as "sold" or "bought" played at varied volumes or at different data compression rates.

Playing a background sound of an actual trading pit which is varied in volume to reflect the amount of current trading activity. Low trading activity would be relatively quiet and fast market conditions would be loud.

Playing either prerecorded verbal comments or text comments read by a synthesized speech program at varied volumes or at different delivery speeds to reflect the significance of the events being commented upon.

The market depth (the entire book of bids including the bids below the current best bid, and all the offers including the offers above the current best offer) on the bid and offer can be represented with sound that could be algorithmically varied in volume to reflect the bullishness or bearishness of the market depth.

The magnitude of bullish or bearish indicators could be represented by the varying volumes or delivery speed of their associated sounds.

Orders being added to the bid side or offered side may be represented by tones or sounds and the volume of these tones in combination with their compression may be varied based on the size of the orders.

Data Delivery Using Separate Audio Channels

As noted above, it is envisioned that there will be at least two different data channels with the present invention. In a preferred embodiment one of the channels continuously delivers comments while the other channel delivers background sounds such as market activity. However, in practice, multiple comments or background sounds can be reported simultaneously on separate audio channels. This is another example of a data manipulation means of the present invention. The result is a listening environment similar to a trading pit where simultaneously shouted bids, offers and trades rapidly convey large amounts of information to the participating traders. Significantly, more information is reported than can possibly be conveyed with comments being made one at a time. By overlapping comments on multiple audio channels the listener can get a rapid feel for the level and urgency of trading activity similar to a trading pit. Each channel's comment can be chosen based on the main decision algorithm (and the over-ride algorithm as discussed further below). Furthermore, the volume and speed of these comments can be adjusted as described above.

Using the same data used above, the following situation exists:

| Update # | Bid | Offer | Priority Value (1) | Frequency | Market Comment |
|---|---|---|---|---|---|
| Market open: | 120 bid | 130 offer | | 1.0 | |
| First update: | 122 bid | 130 offer | 0.4 | 1.5 | "122 Bid" |
| Second update: | 125 bid | 130 offer | 0.5 | 2.1 | "125 Bid" |
| Third update: | 122 bid | 127 offer | 0.5 | 3.0 | "127 Offer" |
| Fourth update: | 129 bid | 130 offer | ? | 3.6 | ? |

Once again the Priority Value excludes the variables Decay Value and Previous Comment Relation variables. As also noted above, the fourth update arrives while the third update's comment is being vocalized.

Fourth Update

Bid Comment=N[129−122]=7/(7+3)=0.7

Offer Comment=N[127−130]=3/(3+3)=0.5

The winning comment is "129 Bid." Since multiple audio channel allocation is available, however, there is no need to over-ride the current vocalization as discussed below. Instead the new market comment is directed to a second audio channel allocated for market comments. In a preferred embodiment, the practical number of audio channels is 6 to 8 separate channels. Beyond these number of channels the individual comments have been found to become indistinguishable to the human ear. Thus, "127 Offer" is reported on audio channel 1, and then "129 Bid" reported on audio channel 2. Below is a summary table:

| Update # | Market Bid | Audio Offer | Priority Value | Freq. | Comment | Channel |
|---|---|---|---|---|---|---|
| Market open: | 120 bid | 130 offer | 1.0 | | | |
| First update: | 122 bid | 130 offer | 0.4 | 1.5 | "122 Bid" | 1 |
| Second update: | 125 bid | 130 offer | 0.5 | 2.1 | "125 Bid" | 1 |
| Third update: | 122 bid | 127 offer | 0.5 | 3.0 | "127 Offer" | 1 |
| Fourth update: | 129 bid | 130 offer | 0.7 | 3.6 | "129 Bid" | 2 |

In addition, if the listener has stereo sound capability then the audio channels can be assigned to left or right speaker. For example, Audio Channel 1 and 3 sent to right speaker, audio channel 2 and 4 sent to the left speaker, and background sound sent to both right and left speakers.

Once volume and vocalization compression are completed, background sounds play on background audio channels as shown at point 58. System 20 returns back to wait point 31 where module 34 waits for new financial data 30 or a predefined time period since completion of the last comment. Comments begin and end, freeing a comment audio channel as shown at point 60. As discussed in greater detail below, a variable N, used to control the number of times an over-ride of a current comment is possible, is set to 0 at the same time. Then, as also described below with respect to over-riding current comments, a flag is checked at decision point 61 to determine if the data reception module should immediately activate without returning to wait point 31. If the flag is set then system 20 immediately returns to module 34. If the flag is not set, then system 20 returns to wait point 31. The above process is repeated until the market closes and the real-time streaming market data stops such that threshold 42 cannot be met or there is no additional data 30 to broadcast.

Priority Over-ride of Comments

As noted briefly above, the present invention includes the ability to institute a priority over-ride. This is yet another example of a data manipulation means. Occasionally there is new market data that is extremely important, so important that it needs to be reported immediately even before the current audio stream is completed, despite the use of one or more audio channels.

The use of the priority over-ride is only typically implemented if there are no comment audio channels available at decision point 36. If no such channel is available then at decision point 62 a determination is made if the data 30 has changed. If it has not changed, then system 20 returns to wait point 31. However, if it has changed then over-ride audio priority values are calculated at point 64. At point 64 it is possible to calculate all of the possible audio priority values as with point 38. However, it is more often preferred that only the priority values of a select few comments that are potentially allowed to override an existing comment be calculated to save on processing time. Once the priority values of one or more over-ride equations are generated, a determination is made at decision point 66 if the new comment is sufficiently more important than a current comment and an override threshold has been met. If it is not then system 20 sets a flag to "run data reception module" when a comment audio channel becomes available at point 68. When the flag is set to on, this is basically an indication that new market data 30 has been received while a comment was being verbalized. Thus, there is no need to return to wait point 31. Instead system 20 should return to data reception module 34. Then this portion of system 20 ends at point 70.

However, if the new comment is sufficiently more important than a current comment on a specific audio channel, then at decision point 72 the determination is first made if the current comment has already been overridden twice for this example, or by a pre-defined threshold number N. If the audio stream has already been overridden two times, then the current audio stream is not over-ridden and control passes to point 68 where system 20 sets a flag to "run data reception module" when a comment audio channel becomes above, as discussed above. Otherwise, at point 76 variable N is incremented by 1 and system 20 passes control to decision point 44. The idea is to avoid interrupting every market comment. Thus, there is a balance and trade-off between delivering the most relevant market data and making audio reports comprehensible. In a preferred embodiment, when a current comment is to be over-ridden and there are multiple comment audio channels available, the current comment on an audio channel with the lowest priority value is preferably over-ridden first.

An example of a priority over-ride situation follows. As with prior examples, ignore the Decay Value and the Previous Comment Relation variables in the priority equations. For purposes of the example, a priority threshold level of 0.2 or higher is set. Therefore, a new piece of market data must result in a priority value that is 0.2 or greater than the current comment's priority value. Using the same market data as above, a fourth market update is added. The fourth update arrives while the third update's comment is still being vocalized.

| Update # | Bid | Offer | Priority Value | Freq. | Market Comment |
|---|---|---|---|---|---|
| Market open: | 120 bid | 130 offer | | 1.0 | |
| First update: | 122 bid | 130 offer | 0.4 | 1.5 | '122 Bid" |
| Second update: | 135 bid | 130 offer | 0.5 | 2.1 | "125 Bid" |
| Third update: | 122 bid | 127 offer | 0.5 | 3.0 | "127 Offer" |
| Fourth update: | 129 bid | 130 offer | ? | 3.6 | ? |

The third update's priority value is 0.5. Therefore, a new market update will need a priority value of 0.7 or greater to interrupt the "127 Offer" comment vocalization: Fourth Update: (Priority value calculation excluding decay and previous comment relation)

Bid Comment=N[129−122]=7/(7+3)=0.7

Offer Comment=N[127−130]=3/(3+3)=0.5

The bid comment wins with a priority value of 0.7. The priority value is 0.2 greater than the currently playing priority value. System 20 immediately stops the "127 Offer" vocalization in mid-stream. In its place the new Priority Over-ride comment of "129 Bid" is reported. Moreover, if volume control and compression control are implemented as discussed above and using the parameters in the corresponding examples above, "129 Bid" is vocalized with 150% greater volume level and 75% time-compression rate. As noted above, a fifth update could over-ride the fourth update, but if so then a sixth update would not be allowed to over-ride the fifth update through the use of the variable N.

When a comment is overridden by a priority comment the losing comment is not stored in a buffer or an output queue. Thus, there is no actual "buffering" in the classic sense. After a higher priority comment is vocalized a new calculation cycle begins. All of the comment priority equations are recalculated, including the equations for the comments that did not win the last calculation cycle or that were over-ridden. The previous cycle's priority calculations are discarded. Therefore, the over-ridden and losing comments will compete with all other comments for the right to be vocalized. However, there is a way to increase the priority of both over-ridden and losing comments into the next calculation round. In order to describe this process we must first define several types of comments.

There are two general categories of comments: "state" and "event" comments. Bid, Bid Size, Offer, and Offer Size are examples of "state" comments. As long as the bids, offers, and the like exist in a market then they will continue to be current and pertinent. Their "state" exists. If a "state" comment is over-ridden or loses in the previous calculation cycle it will compete as per normal with other comments for the next vocalization.

On the other hand, "event" comments are time sensitive. "Event" comments have three sub-categories:
1) Decaying value comments
2) Constant value comments
3) Increasing value comments Trades and Trade Sizes are examples of decaying value "Event" comments. Trades are current the instant they occur and usually decay in importance over time. Therefore, if a trade occurs and is not vocalized (over-ridden or loses) in the current calculation cycle its priority to be vocalized is reduced or decayed as time passes. If a trade is vocalized it is flagged so that it will not be vocalized again.

A price handle change is an example of a constant value "event" comment. If the "big figure" of a market's price changes then the system needs to tell the listener what is the new big figure. The new big figure is referred to as a handle change. Some comments have a special variable called HandleChange in their priority equation. For example, if the bid has dropped from 105 to 98 the system should preferably announce "5 Bid" followed by "98 bid," as opposed to "8 bid." However, if a higher priority offer comment is vocalized instead of "98 bid" and the next bid is 95 then it is still necessary to say the big figure (handle), such as "95 bid" instead of "5 bid." Thus, system 20 preferably insures that the "ninety" part of the bid comment is eventually said by first setting the HandleChange variable equal to a constant, which increases the priority of the handle comment. The HandleChange variable remains equal to the constant (it is not decayed from one calculation cycle to the next) until the handle comment is finally vocalized. After vocalization the HandleChange variable is re-set to zero.

Finally, an example of an increasing value "event" comment is the announcement of an impending economic statistic. This type of comment, which is time dependent, will increase in priority while "waiting" to be vocalized. These types of comments have a special variable called TimeSensitivity in their priority equations. For example let's assume that the monthly US unemployment figure is due out at 9:30 AM and our system should announce the following at 9:29 AM: "unemployment number at 9:30." Now suppose that frenetic market activity results in the generation of many high priority comments. The "unemployment" comment will increase in priority each calculation cycle as 9:30 approaches, ensuring that it will be vocalized well before 9:30 AM. In order to increase this comment's priority value, its TimeSensitivity variable will be increased after each calculation cycle in which this comment is not vocalized. When the comment is finally announced its TimeSensitivity variable will be re-set to zero.

In summary, an overridden comment is not buffered. The buffering effect comes through the priority equations and associated special variables, which as a whole act like an ecosystem. The system is self-correcting by keeping track of past activity through the manipulation of special variables (e.g., Decay Factor, Previous Comment Relation, HandleChange, and TimeSensitivity) that help to "guide" the vocalized output of system 20.

The disclosed embodiments and examples are given to illustrate the present invention. However, they are not meant to limit the scope and spirit of the present invention. Therefore, the present invention should be limited only by the appended claims.

What is claimed is:

1. A financial data system comprising:
   real-time financial data, including a first set of variables and a second set of variables;
   a data reception module to receive said financial data;
   a set of pre-determined rules to dynamically prioritize said first set of variables and said second set of variables and provide a single real-time priority value to said financial data;
   at least one audio channel to broadcast said financial data;
   a data delivery module for converting said financial data into verbal comments; and
   a data manipulation module to dynamically alter an aural delivery of said verbal comments according to said priority value.

2. A financial data system as recited in claim 1, wherein said data delivery module comprises at least one of a pre-recorded audio file, voice synthesizer and live audio streaming.

3. A financial data system as recited in claim 1, wherein said data manipulation module includes volume control.

4. A financial data system as recited in claim 3, wherein said verbal comments are delivered at a volume greater than a base-line volume when said priority value is greater than a pre-determined threshold.

5. A financial data system as recited in claim 1, wherein said data manipulation module includes vocalization compression.

6. A financial data system as recited in claim 5, wherein said verbal comments are delivered in a compressed verbal format when said priority value is greater than a pre-determined threshold.

7. A financial data system as recited in claim 6, wherein a pitch for a given comment remains generally constant between a normal verbal format and said compressed verbal format.

8. A financial data system as recited in claim 5, wherein said verbal comments are delivered at a volume greater than a base-line volume and in a compressed verbal format when said priority value is greater than a predetermined threshold.

9. A financial data system as recited in claim 1, wherein said data manipulation means comprises an override of a current verbal comment by a new verbal comment when said priority value of said new verbal comment is greater than a threshold value when compared to said priority value of said current verbal comment.

10. A financial data system as recited in claim 1, wherein a first set of variables are provided in said financial data and a second set of variables are calculated using said first set of variables, said first and second set of variables being used to generate a listing of possible verbal comments ranked by said priority value.

11. A financial data system as recited in claim 10, said pre-determined rules including a decay value that affects said priority value of said possible verbal comments with each successive calculation of said second set of variables and said listing of said possible verbal comments.

12. A financial data system as recited in claim 10, wherein said second set of variables and said listing of said possible verbal comments are continuously calculated.

13. A financial data system as recited in claim 9, wherein said pre-determined rules include a current set of said variables and a prior set of said variables.

14. A financial data system as recited in claim 9, wherein at least a subset of said variables are normalized to generate said priority values between a pre-determined minimum and maximum value such that each of said possible verbal comments may be compared to all other possible verbal comments to determine a highest ranking priority comment for a specific audio channel.

15. A financial data system as recited in claim 1, wherein there are at least two audio channels, a first audio channel broadcasting background sounds and a second audio channel broadcasting specific market comments according to said pre-determined rules.

16. A financial data system as recited in claim 1, wherein said data manipulation module comprises one of activating a new audio channel and overriding an existing verbal comment when said priority value of a new verbal comment is greater than a threshold value of existing verbal comment.

17. A financial data system as recited in claim 1, wherein said priority value of said verbal comments is adjusted to remove variables used in guiding a sequence of said verbal comments before using said data manipulation module.

18. The financial data system as recited in claim 1, wherein said second set of variables is calculated from said first set of variables.

19. The financial data system as recited in claim 1, wherein said first set of variables includes a monetary value.

20. The financial data system as recited in claim 19, wherein said second set of variables comprises at least one of a frequency, a quantity, a volume, or a period of time.

21. A financial data system comprising:
   real-time financial data;
   a data reception module to receive said financial data,
   a set of pre-determined rules to dynamically prioritize said financial data and provide a real-time priority value to said financial data, a first set of variables provided in said financial data and a second set of variables calculated using said first set of variables, said first and second set of variables being used to generate a listing of possible verbal comments ranked by said real-time priority value;
   a plurality of audio channels to broadcast said financial data, a first audio channel broadcasting background sounds and a second audio channel broadcasting specific comments according to said real-time priority value;
   at least one of a pre-recorded audio file, voice synthesizer and live audio streaming for converting said data into verbal comments; and
   at least one of a volume control, vocalization compression, a new audio channel and an overriding function to dynamically alter an aural delivery of said verbal comments according to said priority value.

22. A financial data system as recited in claim 21, wherein said pre-determined rules include a decay value that affects said priority value of said possible verbal comments with each successive calculation of said second set of variables and said listing of said possible verbal comments, said decay value being removed before using said data manipulation means and after selecting said verbal comments.

23. A financial data system comprising:
   real-time financial data, including a first set of variables and a second set of variables;
   a data reception module to receive said financial data;
   a set of pre-determined rules to dynamically prioritize said first set of variables and set second set of variables, and provide a single real-time priority value to said financial data;
   at least two audio channels being simultaneously used to broadcast said financial data; and
   a data delivery module for converting said financial data into verbal comments.

24. A method for vocalizing real-time financial data comprising the steps of:
   providing real-time data, including a first set of variables and a second set of variables;
   prioritizing said data according to pre-determined rules in a dynamic manner;
   generating a single priority value for said first set of variables and said second set of variables;
   converting said data into a plurality of possible verbal comments;
   selecting at least one verbal comment based on said priority value;
   choosing from one of a plurality of audio channels;
   manipulating said verbal comment and altering an aural delivery of said verbal comment according to said priority value; and
   delivering said verbal comment.

25. A method as recited in claim 24, including the further step of overriding a current verbal comment with a new verbal comment when said priority value of said new verbal comment is greater than a threshold value when compared to said priority value of said current value comment.

26. A method as recited in claim 24, wherein said manipulating step includes a step of adjusting automatically a delivery volume for said verbal comment according to said priority value.

27. A method as recited in claim 24, wherein said manipulating step includes a step of adjusting automatically a vocalization compression for said verbal comment according to said priority value.

28. A method as recited in claim 24, wherein said delivering step includes a step of selecting said verbal comment from a lookup table of pre-recorded market comments and inserting at least a sub-set of said data into said verbal comment.

29. A method as recited in claim 24, wherein said prioritizing step includes using a decay value that effects said priority value on a successive said prioritizing step for said possible verbal comments.

30. A method as recited in claim 24, wherein said converting step includes the sub-steps of
   normalizing said possible verbal comments between a pre-determined minimum and maximum value; and
   comparing each of said possible verbal comments to determine a highest ranking priority comment for a specific audio channel.

* * * * *

UNITED STATES PATENT AND TRADEMARK OFFICE
CERTIFICATE OF CORRECTION

PATENT NO. : 6,507,818 B1  
DATED : January 14, 2003  
INVENTOR(S) : Bradley-Scott Fishman et al.

It is certified that error appears in the above-identified patent and that said Letters Patent is hereby corrected as shown below:

Column 20,
Line 3, delete "means" and insert -- module --.

Signed and Sealed this

Sixteenth Day of September, 2003

JAMES E. ROGAN
*Director of the United States Patent and Trademark Office*